United States Patent [19]
Knox et al.

[11] Patent Number: 5,504,654
[45] Date of Patent: Apr. 2, 1996

[54] CROSS CONNECT SYSTEM FOR TELECOMMUNICATIONS SYSTEMS

[75] Inventors: George J. Knox; William D. McKittrick, both of Austin, Tex.

[73] Assignee: Minnesota Mining and Manufacturing Company, St. Paul, Minn.

[21] Appl. No.: 176,094

[22] Filed: Dec. 30, 1993

Related U.S. Application Data

[60] Division of Ser. No. 927,712, Aug. 17, 1992, Pat. No. 5,281,163, and a continuation-in-part of Ser. No. 764,177, Sep. 23, 1991, Pat. No. 5,178,558.

[51] Int. Cl.⁶ .............................. H02H 3/22; H01R 4/24
[52] U.S. Cl. ........................................ 361/119; 439/410
[58] Field of Search ...................... 361/119, 129, 361/91; 439/715–725, 395

[56] References Cited

U.S. PATENT DOCUMENTS

4,790,770  12/1988  Klaiber ..................................... 439/395

Primary Examiner—A. D. Pellinen
Assistant Examiner—Michael J. Sherry
Attorney, Agent, or Firm—Gary L. Griswold; Walter N. Kirn; Jack V. Musgrove

[57] ABSTRACT

A cross connect system for telecommunication wires reduces the required time to install and effect cross connections if the wire connections are made by hand and changes are made between circuits by unplugging a modular plug and plugging it in at a different position. The connector of the present invention has a terminal block accepting a plurality of plugs connected each to a pair of wires and the plugs fit onto the terminal block or can be stacked on each other for half tapping, testing or transferring. Protected plugs may be provided having overvoltage protection circuits, and jumper plugs may be stacked onto such protected plugs.

8 Claims, 8 Drawing Sheets

CROSS CONNECT SYSTEM FOR TELECOMMUNICATIONS SYSTEMS

CROSS-REFERENCE TO RELATED APPLICATION

This application is a divisional of U.S. patent application Ser. No. 07/927,712, filed Aug. 17, 1992, which is now U.S. Pat. No. 5,281,163, and a continuation-in-part of U.S. patent application Ser. No. 07/764,177, filed Sep. 23, 1991, which is now U.S. Pat. No. 5,178,558.

FIELD OF THE INVENTION

This invention relates to electrical connectors and more specifically to a cross connect terminal for use in telecommunications systems for connecting wire pairs, the tip and the ring, from a central office to wire pairs from a distribution cable. The cross connect terminal of the present invention includes a plurality of overvoltage protection circuits for protecting the connected pairs from, e.g., lightning strikes.

BACKGROUND OF THE INVENTION

Cross connect blocks have been known and used in the telecommunications industry for the purpose of terminating central office cables and matching pairs therefrom with pairs in distribution lines to subscribers. At the point where a cross connect block is used, a large cable from the central office is generally terminated. At this station smaller distribution cables are also connected to cross connect blocks mounted in juxtaposition to the other cross connect blocks permitting the matching of wire pairs of the central office cable with the correct pair to a subscriber. The cross connect blocks permit changes in the phone circuits to be made, they permit tests of the circuits to be made, and transfers can be made. In some installations, the cross connect block permits additional phones to be connected to a given line pair.

Examples of the existing cross connect blocks include U.S. Pat. No. 4,210,378 which uses a screw type binding post to make the connection between one pair of wires and another. One connection is generally a permanent connection to the block. Improvements on this product to make quicker and faster connections are described in U.S. Pat. Nos. 4,431,247 and 4,815,988. Other examples of a different style of cross connect blocks are illustrated in U.S. Pat. Nos. 4,279,460 and 4,789,354. In each of these examples, wire pairs from one line can readily be joined to wire pairs in an adjacent cross connect block by running wires between the contact elements of the two blocks.

In addition to these prior teachings of cross connect blocks and systems of cross connection, the art is replete with patents related to insulation displacement connectors such as U.S. Pat. Nos. 4,341,430, 4,533,196 and U.K. Patent 2,129,630. These references show varying types of telecommunication or electrical connectors wherein the wire is directed into a U-slot in a metal contact element and the contact element displaces the insulation to make resilient pressure contact against the conductor and make electrical connection therewith.

U.S. Pat. No. 4,127,312 and copending application Ser. No. 07/684,323 filed Apr. 12, 1991, and assigned to the assignee of this application, disclose connectors having contact elements for making insulation displacement connection with discreet wires and they teach making connections between different wire pairs. U.S. Pat. No. 4,127,312 teaches the use of contacts disposed at 90° angles with each other such that initially, contact may be made with a discreet wire through the insulation displacement connection portion of the contact and the opposite end of the contact is provided with a tuning fork contact to make electrical contact with the legs of another contact element to join the elements in electrical connection. This patent also illustrates one way to form such a contact, although this construction requires additional space in the connector body and more metal is needed in the contact.

In the cross connect constructions of the prior art, when it is desired to change the position of a wire pair to another terminal block or to change the position of the wires on the same terminal block, it was necessary to disconnect the wire from the connector and make a new connection to a different connector or contact. The present invention provides a plug module joined to two jumper wires and the module can be moved, repositioned, connected and disconnected to a circuit many times and the connection between the wires and the contacts does not have to be changed. They can remain sealed in the plug with the encapsulant surrounding the junction between the wires and contacts.

The present invention further provides a cross connect block wherein the pairs of wires from a cable are joined to a support block and then individual pairs of distribution wires may be joined to the cable. Cross connections (pairs, triples or quads) are run between terminals on the two sides of a distribution frame, or between contacts in a terminal or block. The connector of the present invention affords half tapping or a bridged connection to be made to a circuit without disturbing its continuity. Half tapping affords the use of the same pair of wires from the cable to be directed to additional phones of a particular subscriber.

Further, the connector of the present invention permits stacking of the plugs for the purpose of half tapping or testing the connection to the wire pair from the central office. The plugs of the connector of the present invention also permit the transfer of lines between one wire pair in the cable to another wire pair in a cable without interrupting the continuity of the circuit.

Additionally, the connector of the present invention may advantageously be used with an overvoltage protection circuit. Although such circuits are known for use in cross connect terminals, nothing in the prior art provides for such an overprotection circuit in combination with a detachable jumper, or in the form of a pluggable module which allows further connection of jumper plugs for the above-stated purposes.

SUMMARY OF THE INVENTION

The present invention provides an electrical connector for connection of pairs of wires to other pairs of wires and comprises a terminal block and a plurality of modular plugs formed to mate with the terminal block and to make electrical connection to wires joined to the terminal block. The terminal block comprises a base having means for supporting a plurality of wires and a cover adapted to fit on the base. The cover supports a plurality of terminal contacts for making connection to wires supported by the base and encloses the ends of the wires in the base. The cover member has apertures affording access to the terminal contacts to make electrical connection with the wires. The cover also has location means about the apertures for polarizing pairs of said apertures. The plugs comprise an insulative body having opposite ends and a hinged cap attached to one end of the body by an integrally molded hinge formed between the body and cap. At least one splicing contact is supported in the body with opposite end portions, one of the end portions being adapted to make electrical connection with the terminal contacts and the other end portion being adapted to make electrical connection to a jumper wire. The cap has means for facilitating connection between a jumper wire and the other end portion of the splicing contact. The end of the body opposite the cover has means for mating with the location means of the cover for positioning one end portion of the splicing contact in an aperture to make electrical contact to a terminal contact.

The splicing contact comprises a thin metal plate having an insulation displacing contact portion on one end and a tuning fork contact portion on the other. The tuning fork contact portion is disposed in angular relationship to the insulation displacing portion. The plug preferably has two contacts which are identical and positioned in the plug, with one contact rotated about its longitudinal axis 180° to the other contact.

The plugs are provided with apertures in the cover which afford access to the insulation displacing contacts and permit plugs to be stacked upon each other to provide half tapping and transfer of circuits as will be described later. The plugs also afford means for disconnecting a pair of jumper wires from one set of wires in the terminal block and connecting the same to another set.

In one embodiment, the plugs include an overvoltage protection circuit to minimize damage from voltage spikes caused by, e.g., lightning strikes. The protected plug is preferably keyed to insure that it plugs only directly into the terminal block and not a jumper plug. In this manner, surge protection is afforded to each of the jumpers which may be stacked onto the protector plug.

BRIEF DESCRIPTION OF THE DRAWINGS

The invention will be more fully understood upon reading the detailed description of the invention which refers to the accompanying drawing wherein.

DETAILED DESCRIPTION OF THE PRESENTLY PREFERRED EMBODIMENT

The present invention will be described with reference to the figures of the drawing wherein like parts have like reference numbers throughout the several views.

The connector of the present invention is generally designated 15 and comprises a terminal block 16, having a pair of five pair covers 18, as illustrated, and a plurality of modular jumper plugs 20 formed to mate with the terminal block and to make electrical connection to wires joined to the terminal block 16.

Figure 1:
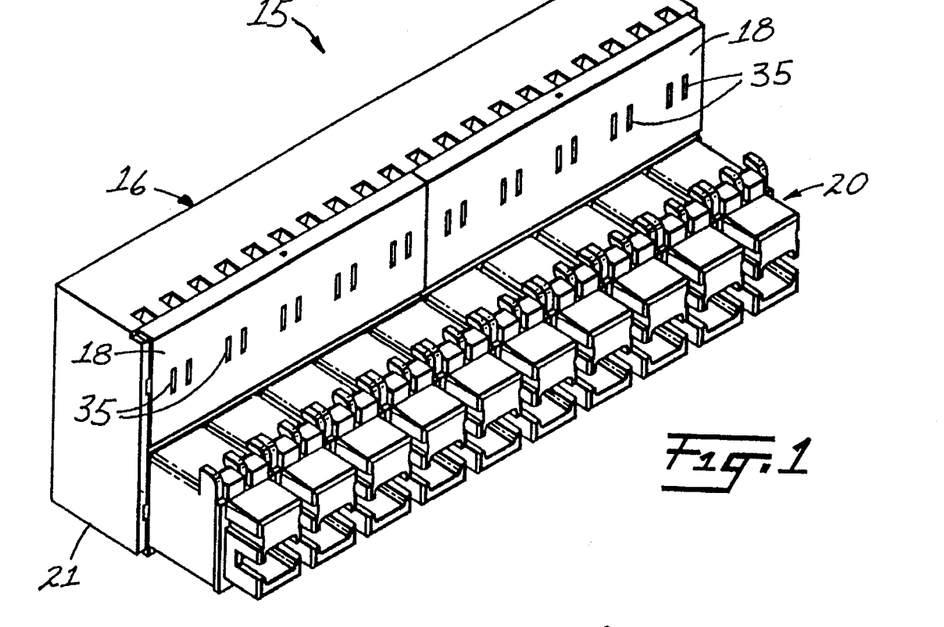
FIG. 1 is an isometric view of the connector of the present invention illustrating the front, top and left end of a cross connect terminal block and a plurality of modular plugs, as positioned during use.
Figure 2:
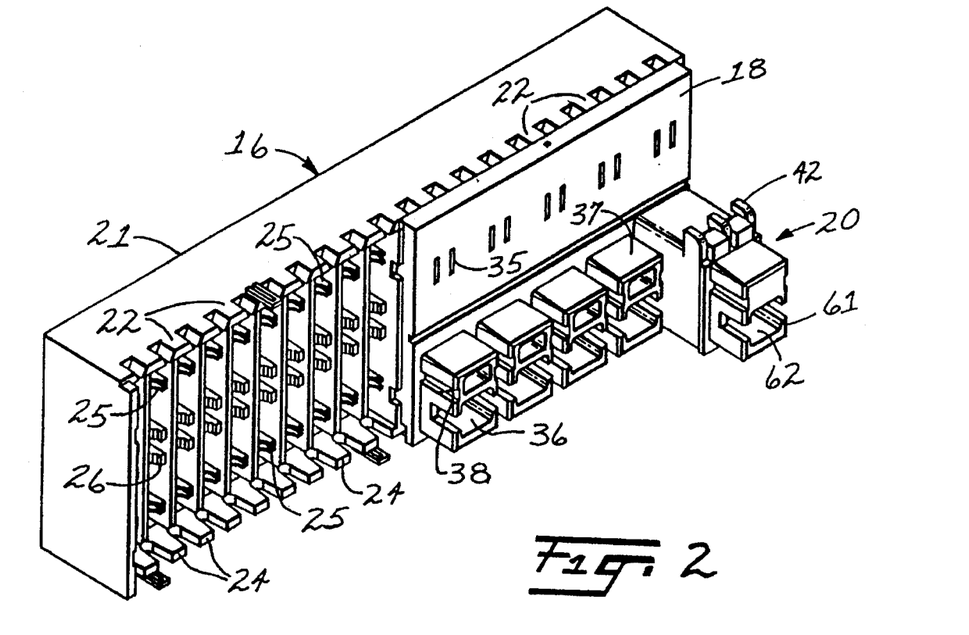
FIG. 2 is an isometric view of the connector of FIG. 1 with parts removed for purposes of illustration of portions behind the removed parts.
Figure 3:
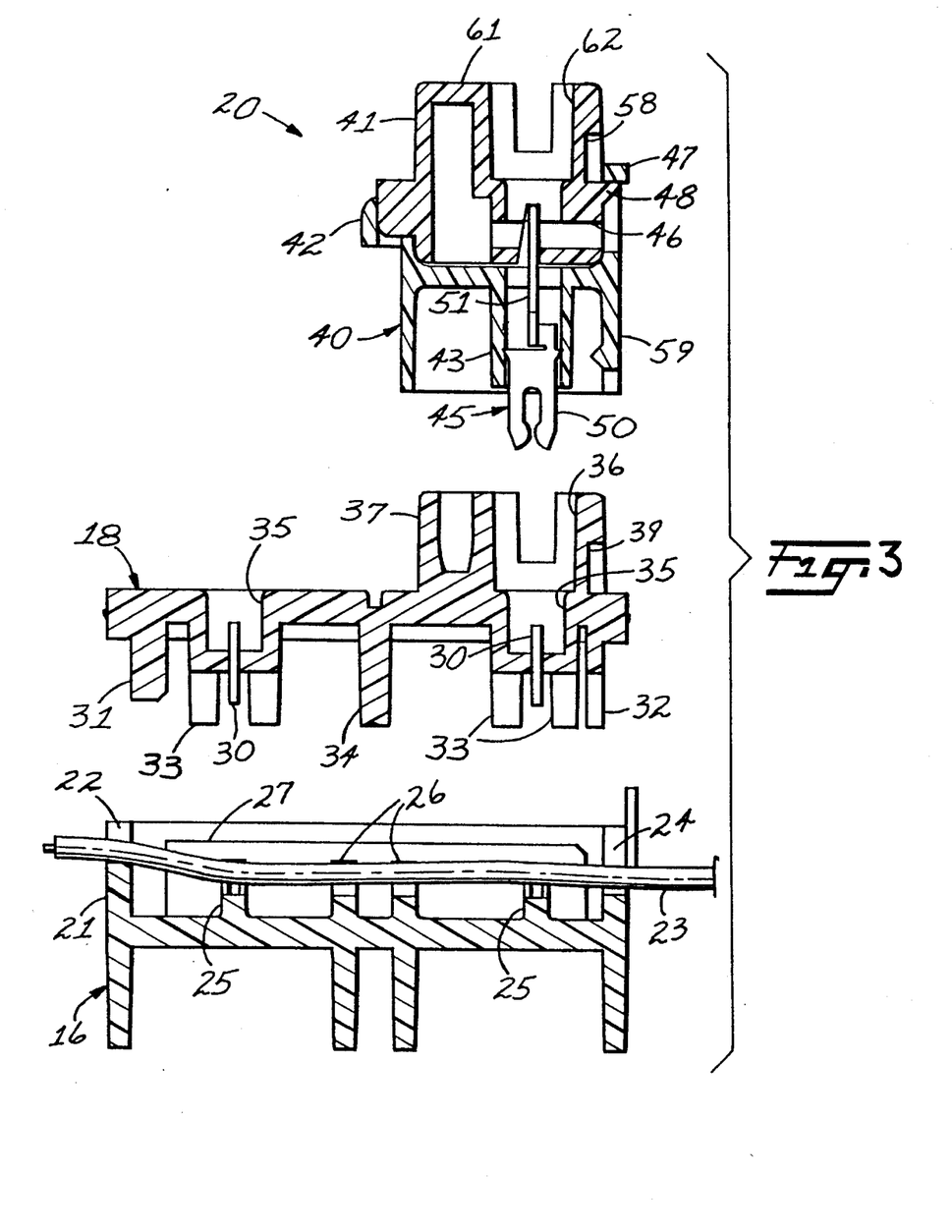
FIG. 3 is an exploded cross sectional view of the parts of the connector as positioned during assembly with a cable.

The terminal block 16 comprises a base 21 having transverse grooves formed between wire combs or posts 22 and posts 24 to define means for supporting a plurality of wires 23 positioned transversely across the base 21. The posts 22 are closely spaced, spaced less than the diameter of the insulation on the wires, such that when a wire is positioned therebetween it is held in place tightly. The inner wall of the base adjacent the posts 22 serves to sever the wires 23 when the covers 18 are assembled on the base 21. As illustrated, the grooves are formed across the base 21 by spaced wire supports 25 and 26 and the supports are recessed to cradle the wires. The supports 25 are positioned adjacent to the posts 22 and 24 and are formed with closely spaced walls, see FIG. 2, to receive the legs of a contact therebetween and the walls of the supports have a rib extending therebetween parallel to the path of the wire to support the wires 23 to drive them into the contacts between the legs thereof. Insulative walls 27 are positioned between the wire channels to isolate the contacts. Alternatively, walls 27 could be provided on cover 18 and extend downwardly into base 21.

The covers 18 are adapted to fit on the base 21 and they support contacts 30 for making a permanent electrical connection to the wire pairs from a cable, they have a cutter bar 31 to sever the wires to length and they serve to encapsulate the wire ends and wire junctions in the base. The covers 18 have a plurality of wire positioning combs, combs 32 adjacent the right edge, combs 33 adjacent to the two rows of contacts 30, and a central comb 34 which fits between and holds the wires in the cradles formed by posts 26.

The covers 18 each have two rows of 10 apertures 35 affording access to the contacts 30 to make electrical connection with the wires. Each cover 18 has integrally formed walls defining a first cavity 36 for receiving the back of a jumper plug 20. Positioned adjacent to the walls defining the cavity are walls defining a rectangular boss 37. The end walls defining the boss 37 have opposite outwardly facing keyways 38. The cavity and boss define location means about one row of apertures 35 for polarizing pairs of the apertures 35 along the bottom edge of the covers 18 of the terminal block and orient the plugs 20 on the terminal block. The apertures 35 of the first or bottom row are positioned within the cavities 36.

Figure 4:
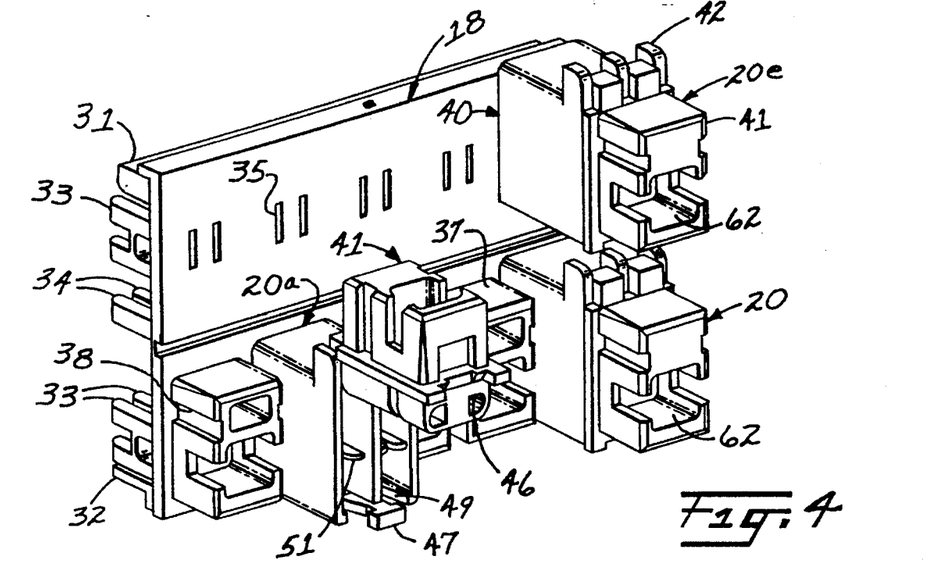
FIG. 4 is an isometric view of the cover of the terminal block for just five pair of wires and illustrates a plurality of modular plugs in various positions.
Figure 5:
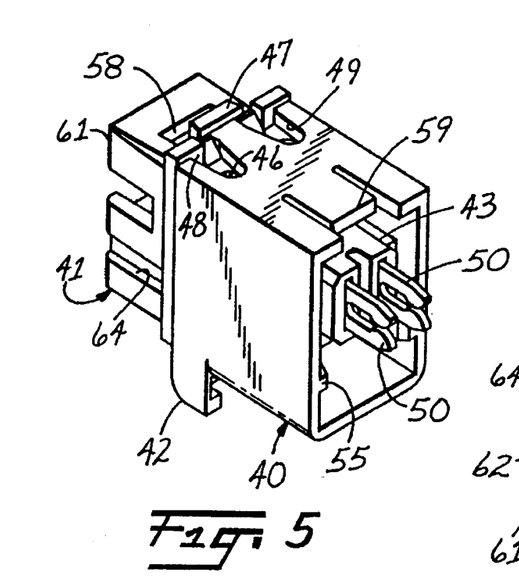
FIG. 5 is an isometric view of a modular plug showing the back, bottom and left side.
Figure 6:
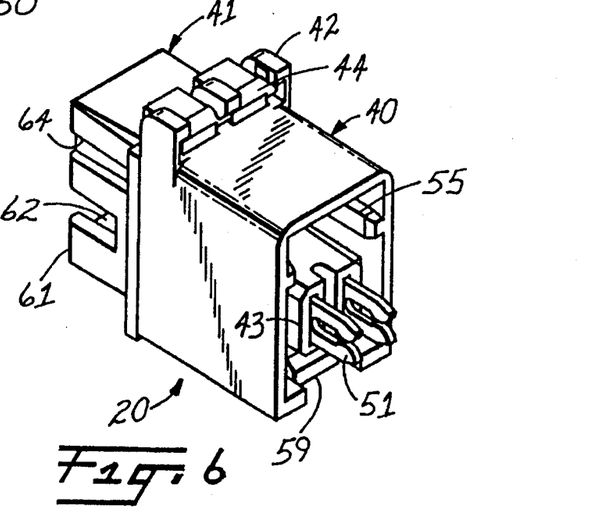
FIG. 6 is a perspective view of the plug of FIG. 5 showing the back, top and right side thereof.
Figure 7:
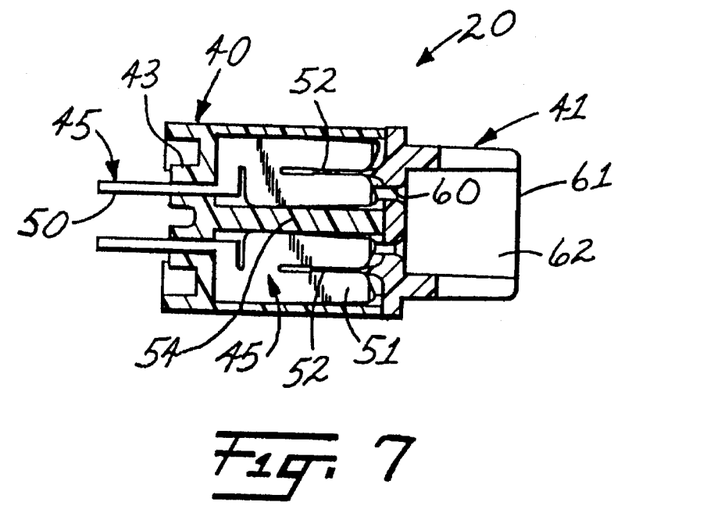
FIG. 7 is a vertical sectional view of the plug.
Figure 8:
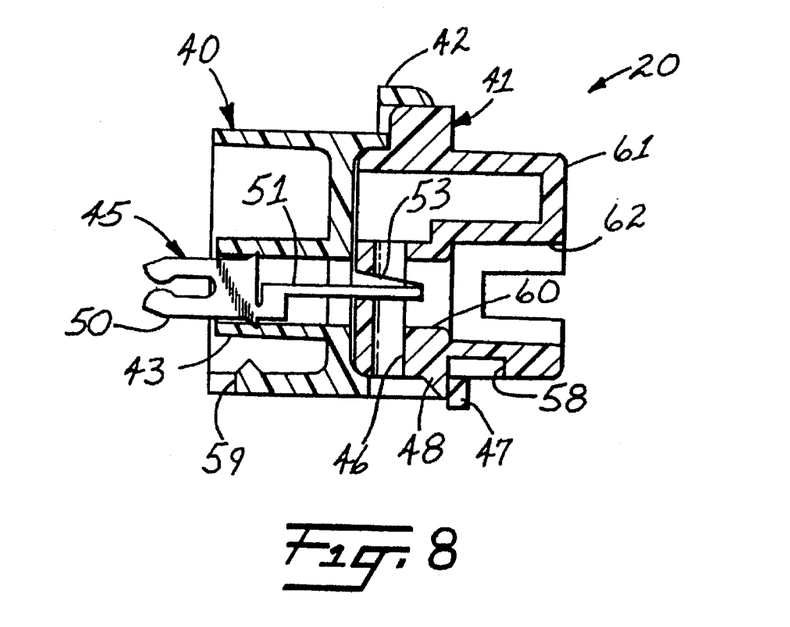
FIG. 8 is a horizontal sectional view of the plug.

The second row of apertures 35, disposed in a row along the upper edge of the covers 18 are positioned above the second row of contacts 30. The apertures 35 accommodate the plugs 20 but do not have the location means surrounding them but they have the same appearance and spacing as the apertures 35 of the first row. In FIG. 4, two plugs are illustrated in position on the location means at two places on the cover 18 and one plug 20e is illustrated in the assembled position on the second row of apertures 35.

Referring now to FIGS. 4 through 10, the jumper plug 20 comprises an insulative body 40 and a cap 41. The cap is attached to the body by integrally molded hinge portions defined by ears 42 on the body 40, having cavities and a hook shape center ear, to receive the trunnion 44 molded with the cap 41. The body is generally rectangular and box-like in outer appearance, which is defined by thin molded walls. The interior of the body 40 is formed with a support 43 for a pair of identical conductive metal splicing contacts 45. The cap 41 is formed with two wire receiving channels 46. An integrally molded resilient latch 47 projects between two wire receiving recesses 49 in the bottom side of the body 40 to a position to engage a detent 48 on the cap 41 to secure the cap in place when in the closed position.

Each splicing contact 45 is formed of a thin metal plate having a tuning fork contact portion 50 on one end adapted to make contact with a leg or blade of another contact and a wire insulation displacing contact portion 51 on the other end for making an electrical connection with a wire. The contact portion 51 is disposed in a plane at 90° to the plane of the tuning fork portion 50. The portion 51 has a deep slot 52 to receive the jumper wires and the slots 52 are disposed in aligned relationship with the channels 46 in the cap 41. The portions 50 and 51 are formed by bending the thin metal plate about an axis such that the centerline of the tuning fork contact 50 lies in a plane parallel to portion 51 and through the center axis of portion 51. The plane of the tuning fork portion 50 is offset to make connection with one of the legs of the contact portion 51 or one of the contacts 30 at a position offset from the slot therein. As illustrated most clearly in FIGS. 7, 8 and 10, one contact 45 is rotated about a longitudinal axis by 180° in relationship to the other contact of the pair. The contacts 45 are positioned in the body 40 with the portions 50 projecting from the bottom surface sufficiently to penetrate the apertures 35 in the cover 18 and make good electrical contact with a contact 30. The bent portion of the contact forming the portion 51 provides a support surface for the contact 45 in the bottom of a cruciform recess molded in the support 43 of the body 40, see FIGS. 7 and 8 where the contacts 45 are held by barbs penetrating the walls of the recess and the support 43 has an aperture through which portion 50 of the contacts 45 project. The portion 51, on the other hand projects into the upper portion of the body to receive the jumper wire positioned therein by the cap wire receiving channels 46. The splicing contacts 45 are separated by a thin wall member 54 formed in the body 40 to electrically isolate the same.

The body 40 is formed with a rectangular recessed area to receive a boss. This area has keys 55 formed in the walls which keys 55 are of a size and shape to be received in the keyways 38 of the boss 37. The keys 55 and keyways 38 provide the orientation as described above and they also provide mechanical support to prevent forces from side loads (pulling on the jumper wires e.g.) from disturbing the electrical connection of a contact portion 50 with a contact 30 or a contact portion 51. The body 40 is also formed with a second resilient latch 59 in the bottom wall which is received by the recess 39 in the bottom wall member forming the cavity 36 on the cover 18 or in a recess 58 formed in the front part and lower wall 61 of cap 41, see FIG. 8. The latch 59 is spaced from the support 43 for the splicing contacts 45, which support 43 is shaped to be received in the cavity 36 with the keys 55 in keyways 38 and the latch 59 in the recess 39. The walls of the body 40 surround the boss 37 and the walls defining the recess 36.

Figure 9:
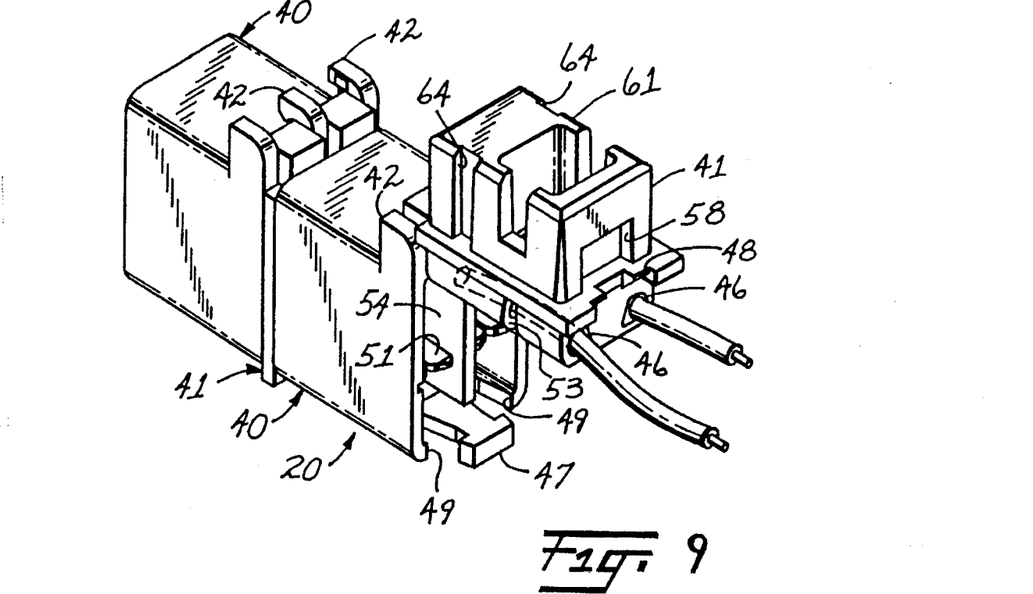
FIG. 9 is a perspective view of a pair of stacked plugs, with the cap of the top plug in the open position and a pair of wires inserted in the ports in the cap.
Figure 10:
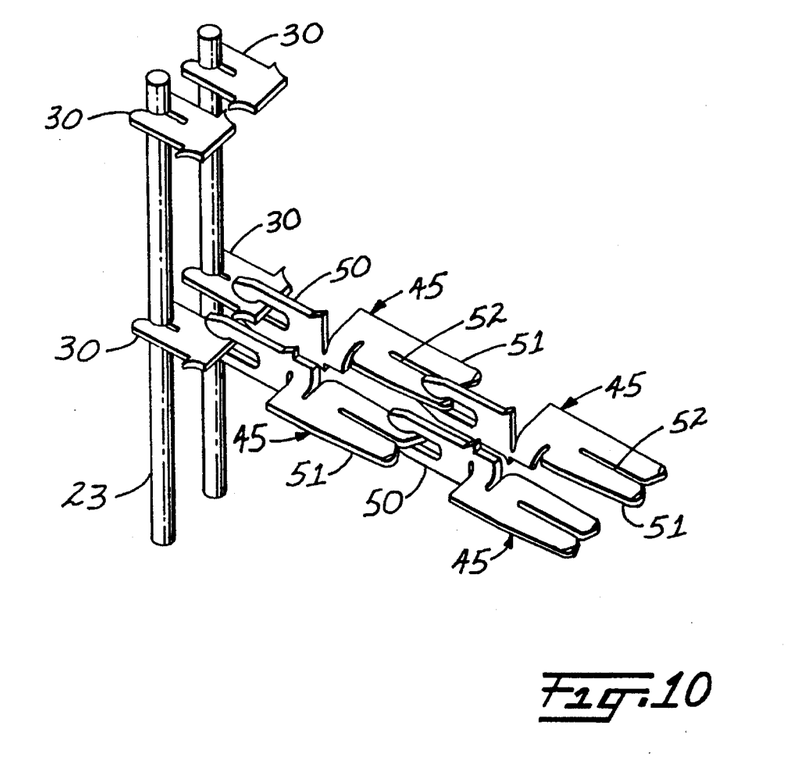
FIG. 10 is a perspective view of some of the contacts of the connector terminal block and a pair of modular plugs with wires connected to the terminal block contacts to diagrammatically illustrate the electrical connections.
Figure 11A:
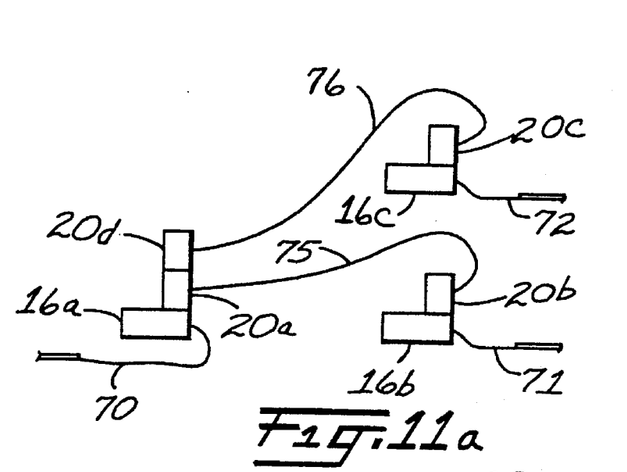
FIGS. 11a, 11b, 11c and 11d diagrammatically illustrate the transfer steps to transfer a circuit from a cable and an old distribution cable to the cable and a new distribution cable without interruption of the circuit.
Figure 11B:
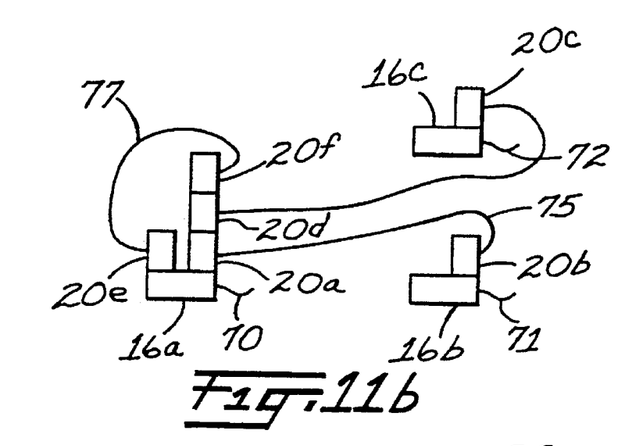
Figure 11C:
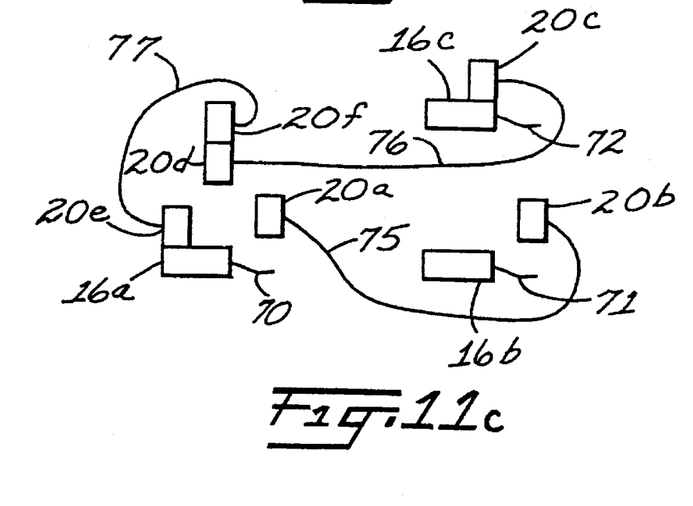
Figure 11D:
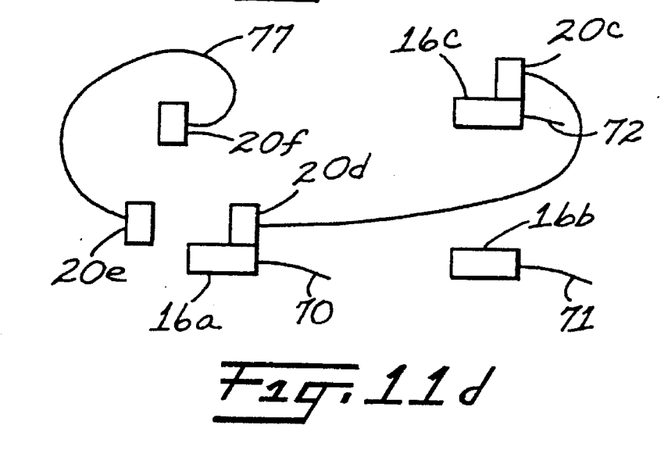

The cap 41 is hinged to pivot from a raised front wire loading position, see plug 20A with the cover open in FIG. 4, to a closed position to dispose the wires in the channels 46 in the contact portions 51. Slots 53 are formed transversely to the channels 46 to receive the contact portions 51 but the channels serve to support the wire so it will be properly inserted into the slot 52 of the contact. The caps 41 are also provided with slots or apertures 60 in the top or front wall. The apertures 60 are surrounded, by walls 61 defining another cavity 62 for receiving the splicing contact support 43 of a body 40. The apertures 60 are formed like the apertures 35 and the walls 61 also form a rectangular boss with keyways 64 to receive the keys 55. The bottom wall of the cap 41 has the recessed area 58 positioned above the detent 48 which will also receive the latch 59 to hold one plug 20 onto another in the stacked position. FIGS. 9 and 10 illustrate the stacking of the modular plugs, with the splicing contacts 45 of one plug making electrical contact with the legs of the contact portion 51 of the lower plug, which in turn is electrically connected to the bottom row of wire contacts 30.

The base 21 of the terminal block is preferably formed of glass-filled PBT thermoplastic and the covers 18 are formed of a similar insulative material. Since the base and cover are used to make a severing member for the wires they are both formed of a high tensile strength glass-filled engineering plastic with sufficient hardness to sever the wires. Even though the terminal block needs to make only one termination to the wires, if it is made from a strong plastic it restricts the need for metal cutting devices to be used in the severing of the wires. Suitable materials include Valox 420, available from General Electric Company, Plastics Group, One Plastics Avenue, Pittsfield, Mass. 01201, 30% glass-filled Ultem, also available from General Electric Company or 30% glass-filled SAN available from ICI Advanced Materials, 475 Creamery Way, Exton, Pa.

The connector of this invention is preferably sealed with a moisture restrictive sealant to encapsulate the junctions between the wires and contacts. Such sealant material will be placed in the base 21 and in the body 40 and cap 41.

The connector of the present invention affords the stacking of plugs 20 to provide for testing of the connections with the wires from the cable. The stacking also affords half tapping to the circuit. Additionally, plugs can be mounted on the covers and make electrical connections with the wires from the cables through the second row of apertures 35. Further, the novelty of having a pair of jumper wires in each repositionable modular plug permits the plug to be readily repositioned to move the subscriber from one incoming line to another by simply unplugging the plug 20 from one position and attaching it another place on the cover 18 or to another connector.

When it is desired to transfer a subscriber from an old line to a new line, the connector of the present invention makes such a transfer easy using one temporary and one replacement jumper line. When the transfer is finished, the temporary jumper line and the original jumper line are left over but both are reusable. Referring now to FIGS. 11a through 11d, there is illustrated the steps of the transfer of a circuit between two cables 70 and 71 to a circuit between cables 70 and 72 without interrupting the continuity of the new circuit. The present circuit is between the incoming cable 70 to a terminal block 16a, joined by a plug 20a and jumper wire 75 to a plug 20b connected via the terminal block 16b to the old cable 71. The new cable 72 is joined to a terminal block 16c. The first step is to prepare a jumper consisting of a plug 20d, Jumper wire 76 and a plug 20c. The plug 20d is stacked on plug 20a and plug 20c is connected to terminal block 16c. The first connection is made to the new line. Secondly, another jumper is prepared having a plug 20e, wire 77 and a plug 20f. The plug 20e is connected to the contacts 30 joined to cable 70 beneath the second row of apertures 35 and the plug 20f is stacked on top of plug 20d, see FIG. 11b. With these connections made there are redundant circuits between the cable 70 and the jumper wire 76. Now, plug 20a may be removed from the terminal block 16a and disconnected from plug 20d without interrupting the new circuit to cable 72. When plug 20d is positioned in the place of plug 20a, the transfer between the cable 70 and the cable 72 is complete and plugs 20e and 20f may be unplugged. The plugs 20d and 20c are also positioned to resist pullout as were the original plugs 20a and 20b.

Figure 12:
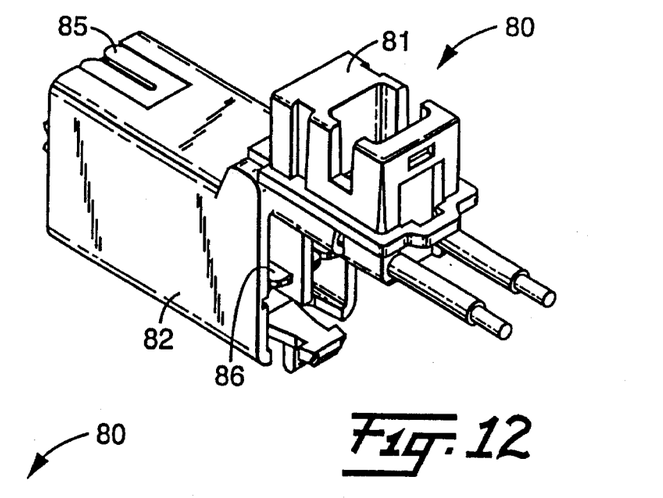
FIG. 12 is a top perspective view of the protected plug embodiment of the present invention.
Figure 13:
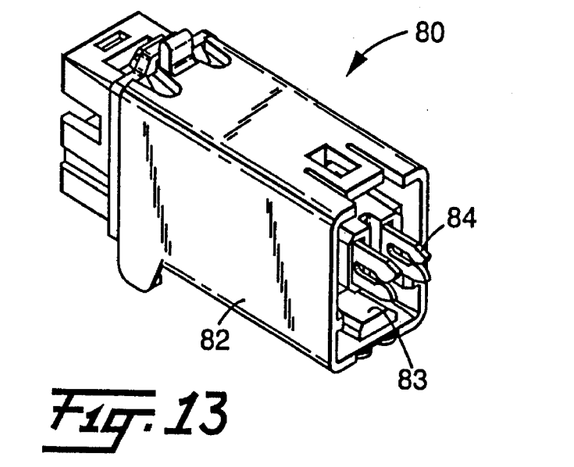
FIG. 13 is a bottom perspective view of the protected plug embodiment of the present invention.
Figure 14:
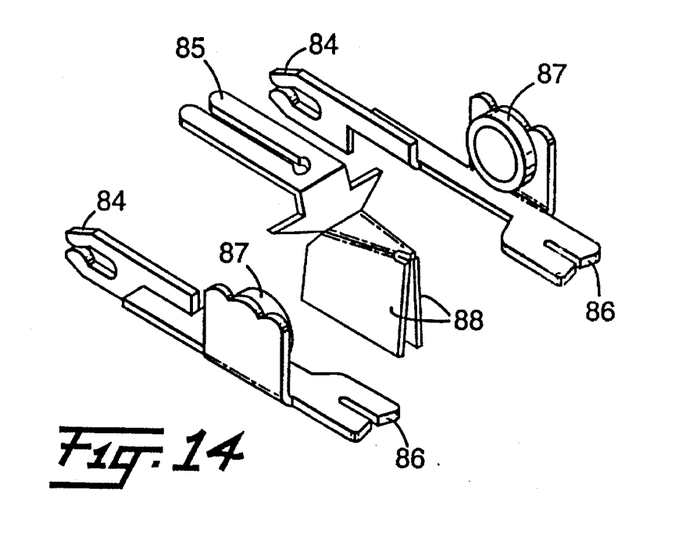
FIG. 14 is a perspective view of the protected contacts and voltage limiting elements which are located in the protected plug.
Figure 15:
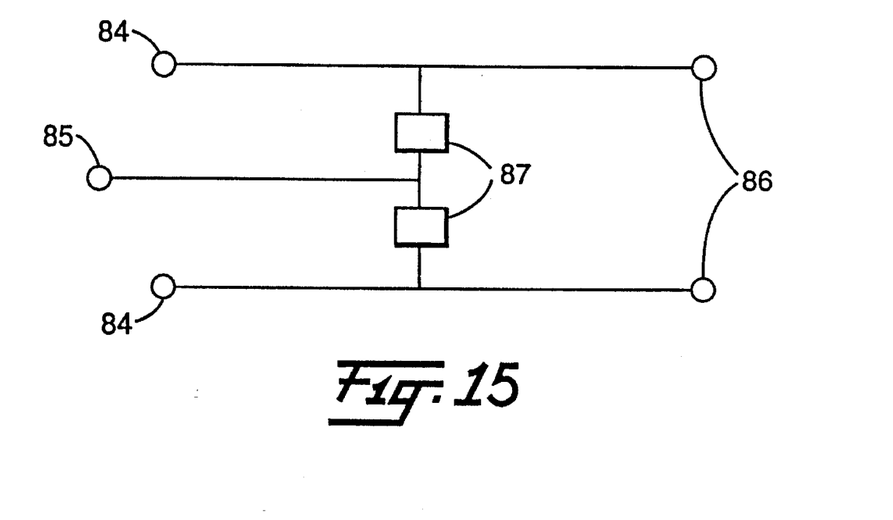
FIG. 15 is a schematic diagram of the protection circuit used in the protected plug.

With reference now to FIGS. 12–14, the protected plug embodiment 80 of the present invention is described. Protected plug 80 is very similar to jumper plug 20, with the addition of an overvoltage protection circuit, schematically illustrated in FIG. 15. Protected plug 80 has a cap 81 which is essentially identical to cap 41, and a body 82 whose outer appearance is similar to body 40, with three differences: body 82 is slightly longer than body 40; body 82 has a keying element 83 recessed within one end, adjacent the tuning fork contacts 84; and body 82 has a ground contact 85 at the same end as keying element 83. As with plug 20, plug 80 also has wire insulation displacing contacts 86. As shown in FIG. 14, each tuning fork contact 84 is integrally formed with (and thus electrically connected to) an associated insulation displacement contact 86; the length from the tip of tuning fork contact 85 to the tip of insulation displacing contact 86 is typically 0.975". The two so associated pairs of protected contacts are separately connected to ground contact 85 with intervening voltage-limiting elements 87. In the preferred embodiment, voltage-limiting elements 87 comprise diac or tigger diodes, which are normally insulative, but short across if the voltage exceeds a predetermined amount, such as 270 volts. These particular elements are also advantageously very small, about 0.2" in diameter. Voltage-limiting elements 87 are connected to ground contact 85 by leaf contacts 88 which are integrally formed with ground contact 85. A wall (not shown) is formed along the inner surface of body 82 to support and position ground contact 85, the wall being interposed between the leaf contacts 88.

Figure 16:
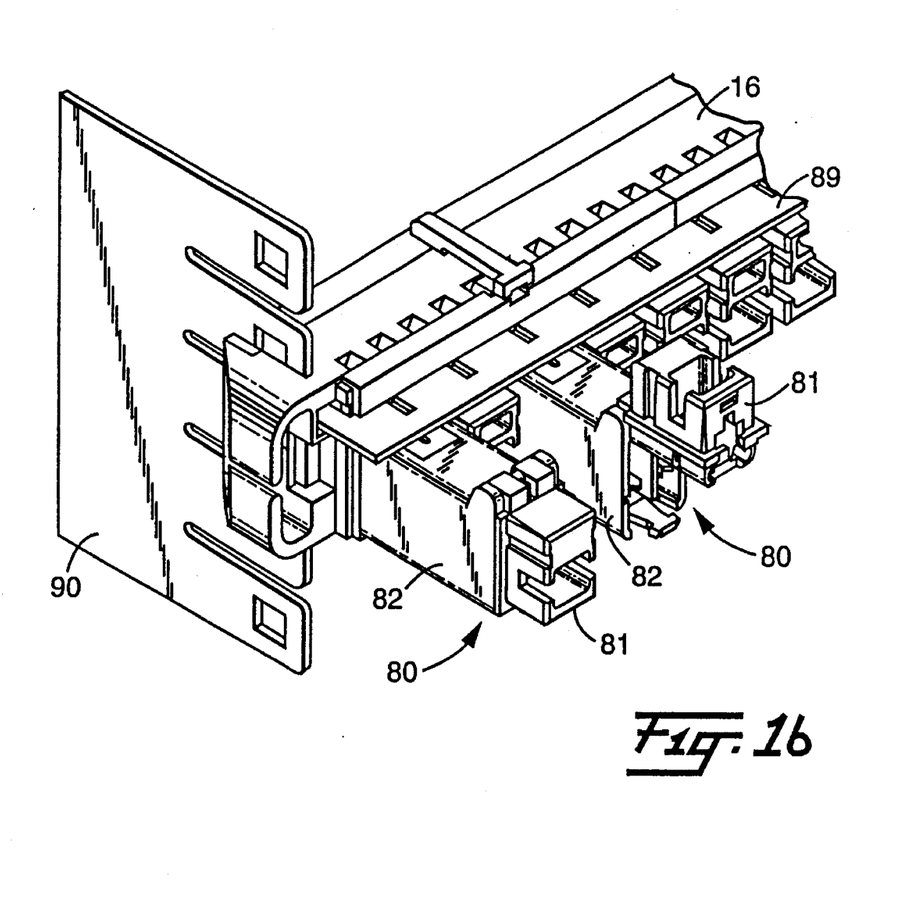
FIG. 16 is a perspective view of a portion of a cross connect terminal block of the present invention having a grounding bar for connection to the ground contact of the protected plugs.

To provide an electrical connection to ground, terminal block 16 is provided with grounding means which preferably takes the form of a bar 89 extending the length of terminal block 16, as seen in FIG. 16. Grounding bar 89 includes a plurality of prongs (not shown), one at each connection point, for connecting to ground contact 85. In this manner, when a plug 80 is attached to terminal block 16, ground contact 85 automatically engages a prong of grounding bar 89. Grounding bar 89 may be connected to earth ground by any convenient means, such as connection to the distribution frame 90, which is in turn connected to ground by a large gauge wire (e.g., 6 AWG). Grounding bar 89 is preferably attached to base 21 although it could also be attached to cover 18.

The primary benefit in using plug 80 is to prevent or minimize damage caused to the connected wires and related components due to voltage surges in the wires, e.g., as a result of a lightning strike. The foregoing design of protected plug 80, however, imparts several other advantages, in addition to those already present in jumper plugs 20. First, if the jumper connection through a plug 80 is to be moved from one location to another on terminal block 16, then the protection circuit automatically moves with the jumper, in contrast to prior art terminal block which either require the separate relocation of the protection circuit, or require that each location on the terminal block be provided with such a circuit regardless of whether that location is actually being used for a cross connection. Secondly, since cap 81 of protected plug 80 is identical to cap 42 of plug 20, it provides for stacking of other jumper plugs 20 on protection plug 80. Thus, the protection circuit serves to protect the wires in each of the so stacked plugs. Also, the provision of keying element 83 in plug 80 allows plug 80 to be plugged into terminal block 16 only, and not into the cap 42 of a jumper plug 20. This ensures that jumper plugs will only be stacked on top of a protected plug 80, and not vice versa, which in turn ensures that all wires connected in a stack will receive the benefit of the protection circuit. In other words, if a jumper plug 20 were first plugged into terminal block 16 and then a protected plug 80 were stacked onto the jumper plug, the wires in the jumper plug would not be protected (this configuration would also be more complicated in that it would require some other means for connecting ground contact 85 to grounding bar 89). Nevertheless, the craftsperson has the choice of connecting either a jumper plug 20 or a protected plug 80 to terminal block 16, depending upon the particular conditions, and, furthermore, any number of protected plugs may be added to the system (one at at time) after original installation. Of course, means could be provided to prevent jumper plugs 20 from being connected directly to terminal block 16. Finally, the foregoing design provides a compact package for providing overvoltage protection, further facilitating use in high-density environments.

The connector for use as a cross connect block has been described with reference to one embodiment. It is to be understood however that modifications may be made without departing from the spirit of the invention. Some modifications include the reduction in size of the covers and base to a single row of wire contacts 30 and making the same narrower, i.e. reducing the width of the base and covers to support only one row of contacts 30 and to have only the locating means; making the bases 25 pair long instead of 10, such that five covers 18 can be placed on one base 16; making the covers longer; providing an alternative physical assembly for the protected contacts; or provide other electronic components within a plug, such as a remote isolation device (RID or MTU), a radio frequency filter (RFI), a half-ringer, a fail-short to ground device, or a current-limiting device. These and other modifications are contemplated and the scope of the invention is defined by the appended claims.

We claim:

1. An overvoltage protection plug for connecting a pair of wires to a pair of terminal contacts, respectively, the plug comprising:

an electrically insulative body having first and second ends;

first and second contacts located at said first end of said body, each being adapted to make electrical connection with one of the terminal contacts;

third and fourth contacts located at said second end of said body, each being adapted to make electrical connection with one of the wires, said third contact being electrically connected to said first contact, and said fourth contact being electrically connected to said second contact;

a ground contact located at said first end of said body;

first means for limiting voltage passing through said first and third contacts, electrically connected to said ground contact; and second means for limiting voltage passing through said second and fourth contacts, electrically connected to said ground contact.

2. The plug of claim 1 wherein said first and third contacts are integrally formed, and said second and fourth contacts are integrally formed.

3. The plug of claim 1 further comprising an insulative cap hingedly attached to said second end of said body.

4. The plug of claim 1 wherein:

said first and second contacts are tuning fork contacts; and said third and fourth contacts are wire insulation displacing contacts.

5. The plug of claim 1 further comprising a keying element attached to body at said first end thereof.

6. The plug of claim 1 wherein:

said first and second contacts extend away from said first end of said body in a first direction;

said third and fourth contacts extend away from said second end of said body in a second direction which is generally opposite to said first direction; and said ground contact is located between said first and second contacts, and extends away from said first end of said body in said first direction.

7. The plug of claim 3 wherein said cap has means for facilitating connection between the third and fourth contacts and the pair of wires, respectively, as said cap is moved from an open position to a closed position.

8. A modular terminating system for connecting a plurality of first wire pairs to a plurality of second wire pairs, respectively, said system comprising:

a terminal block including a base having means for supporting the first plurality of wire pairs, an electrically conductive grounding bar attached to said base, and a cover adapted to fit on said base, said cover having a plurality of pairs of terminal contacts for making connection to the first plurality of wire pairs, respectively, and a plurality of pairs of apertures affording access to said terminal contacts;

a frame supporting said terminal block, said grounding bar being electrically connected to said frame;

a plurality of protected plugs for making electrical connection with said terminal contacts, each said protected plug comprising an electrically insulative body having first and second ends, said body having therein a pair of protected contacts, each protected contact having a first end portion located at said first end of said body, being adapted to make electrical connection with one of said terminal contacts, and a second end portion located at said second end of said body, being adapted to make electrical connection with one of said second pair of wires, each said first end portion comprising a tuning fork contact, and each said second end portion comprising a wire insulation displacing contact, an insulative cap hingedly attached to said second end of said body, said cap having means for facilitating connection between one of the pairs of said second plurality of wire pairs and said second end portions of said protected contacts, respectively, as said cap is moved from an open position to a closed position, a ground contact attached to said first end of said body, being adapted to engage said grounding bar, means for limiting the voltage passing through said protected contacts, and means for connecting said voltage limiting means to said ground contact; and at least one jumper plug means for connecting another pair of wires to said second end portions of a selected one of said protected plugs.

* * * * *